United States Patent [19]

Sibalis

[11] 4,137,488
[45] Jan. 30, 1979

[54] MODIFIED INDUCTION MOTOR FOR USE IN A THREE PHASE POWER SYSTEM

[76] Inventor: Dan Sibalis, 90 Gold St., New York, N.Y. 10038

[21] Appl. No.: 760,461

[22] Filed: Jan. 18, 1977

[51] Int. Cl.² ............................................. H02P 1/02
[52] U.S. Cl. .................................. 318/778; 318/748; 318/749; 318/767
[58] Field of Search ................... 318/225 R, 230, 227, 318/220 R, 216, 213, 195, 206, 207 R, 207 B

[56] References Cited

U.S. PATENT DOCUMENTS

| | | | |
|---|---|---|---|
| 1,313,078 | 8/1919 | Emmet | 318/207 R |
| 1,547,844 | 7/1925 | Tanner | 318/220 R |
| 2,469,294 | 5/1949 | Dawson | 318/216 X |
| 2,592,492 | 8/1952 | Traut | 318/207 A |
| 2,886,756 | 5/1959 | Schaefer | 318/207 A |
| 3,398,329 | 8/1968 | Cataldo et al. | 318/207 R |

OTHER PUBLICATIONS

Navy Training Course, Naupers 10086-A, G.P.O., 1960, p. 260.

*Primary Examiner*—Herman J. Hohauser
*Attorney, Agent, or Firm*—Hopgood, Calimafde, Kalil, Blaustein & Lieberman

[57] ABSTRACT

An electric motor arrangement in which a modified induction motor is operated as a three-phase motor by connecting one of the input phases to the junction of the two motor windings, and by connecting the other two input phases to the other sides of the two motor windings. In one embodiment of the invention, one of the input phases is connected to the junction of the windings through a centrifugal switch. The induction motor may be a modified version of a permanent-split-capacitor type wherein the motor capacitor, conventionally connected across the free ends of the windings, is removed.

5 Claims, 3 Drawing Figures

MODIFIED INDUCTION MOTOR FOR USE IN A THREE PHASE POWER SYSTEM

The present invention relates generally to electrical motors, and more particularly to an electrical motor for use with a three-phase electrical power system.

Single-phase induction motors have long been recognized as highly advantageous for use in certain applications, particularly those requiring fractional horsepower output. These motors are characterized by reduced cost and high torque. One commonly used single-phase induction motor is the permanent-split-capacitor (PSC) motor in which a capacitor is connected across the free ends of the main and auxiliary windings to create a phase different between the windings so as to produce two-phase operation of the motor.

However, in many motor applications, such as in the operation of home appliances, it is advantageous to employ the three-phase power lines that provide a.c. power to the home. These applications have generally required the use of three-phase motors, which are generally bulkier and more expensive than single-phase induction motors of comparable power outputs.

It is an object of the present invention to provide a means for using a modified single-phase system.

It is a further object of the invention to provide a motor for use with a three-phase power system, which is lower in cost than conventional three-phase motors and which produces increased motor torque.

To these ends, the motor of the present invention is a modified version of a single phase induction motor. The motor of the instant invention can advantageously be operated as a three-phase motor by connecting one of the input phases to the junction of the two motor windings and the other two input phases to the other ends of the two motor windings. In one embodiment of the invention, one of the input phases is conncted to the junction of the windings through a centrifugal switch.

To the accomplishment of the above and such further objects as may hereinafter appear, the present invention relates to an improved electric motor arrangement, substantially as defined in the appended claims, and as described in the following specification considered along with the accompanying drawing, in which:

Figure 1:
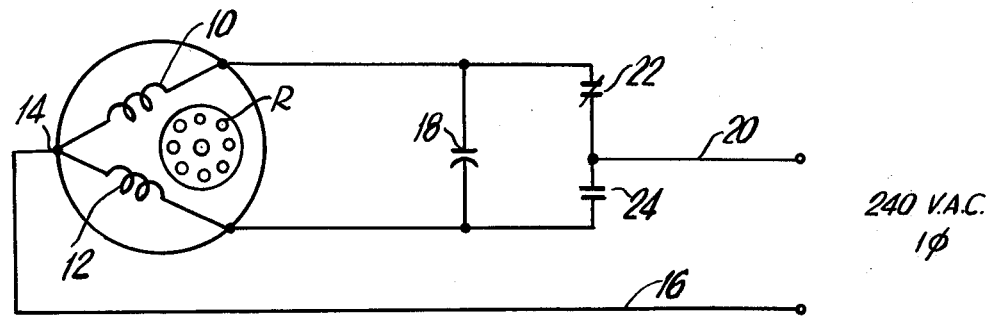
FIG. 1 is a schematic diagram of a conventional single phase PSC motor.

According to the present invention, a single-phase induction motor, such as a conventional permanent-split-capacitor (PSC) motor is modified for operation in a three-phase system. As shown in FIG. 1, a prior art motor of the PSC type includes a first or main stator winding 10 and a second or auxiliary stator winding 12, which are arranged about a rotor R in a conventional manner. The stator windings are preferably substantially identical in number of turns and type of wire used, and are designed for operation at 240 V.A.C. The junction 14 of the windings is connected to one line 16 of a one-phase 240 V.A.C. power line, and a motor capacitor 18 is connected across the free ends of the windings.

The other line 20 of the single-phase power supply is connected through one of the contacts 22 or 24, only one of which is closed at a given time in response to the energization of a motor-direction relay (not shown). In FIG. 1, contact 22 is shown closed to connect the power line 20 to the free end of winding 10. As is known, the capacitor 18 shifts the phase between the two windings to create two-phase operation of the motor. The phase difference between the currents in the main and auxiliary stator windings results in a rotating stator field, which produces a starting torque on the rotor.

In the motor arrangement according to the invention, the single-phase motor of FIG. 1 is modified and connected for operation with a three-phase system, and in one embodiment described more completely below, an increased starting torque of the motor is achieved by applying an increased starting voltage across the stator windings.

Figure 2:
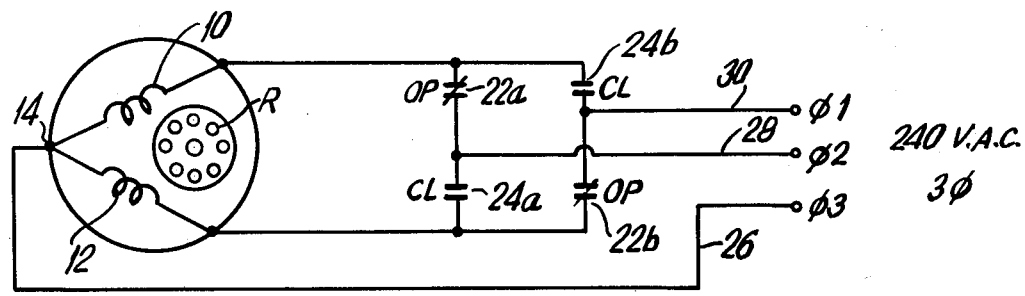
FIG. 2 is a schematic diagram of a motor arranged for operating with a three-phase system in accordance with an embodiment of the invention.

In the embodiment of the invention shown in FIG. 2, the conventional motor capacitor is removed from across the free ends of the stator windings. The motor is connected for operation with a three-phase 240 V.A.C. power line in the following manner. The $\phi 3$ line 26 is connected to the junction 14 of the stator windings. The $\phi 2$ line 28 is connected through one of the contacts 22a or 24a to the free end of one of the windings 10, 12 (contact 22a is shown closed in FIG. 2), whereas the $\phi_1$ line 30 is connected to the free end of the other stator winding through one of contacts 22b or 24b (contact 22b being shown closed in FIG. 2). The closing of the contacts 22 or 24 is controlled by the operation of a direction-control relay (not shown).

In this manner, the two stator windings are fed by two phases of the 240 V.A.C. power line, which are shifted in phase by 120°. This is a 30° greater phase shift than that theoretically provided in a conventional two-phase motor operation of a PSC motor, and in fact approximates the same 60° relative displacement as a conventionally, single main operated motor.

Figure 3:
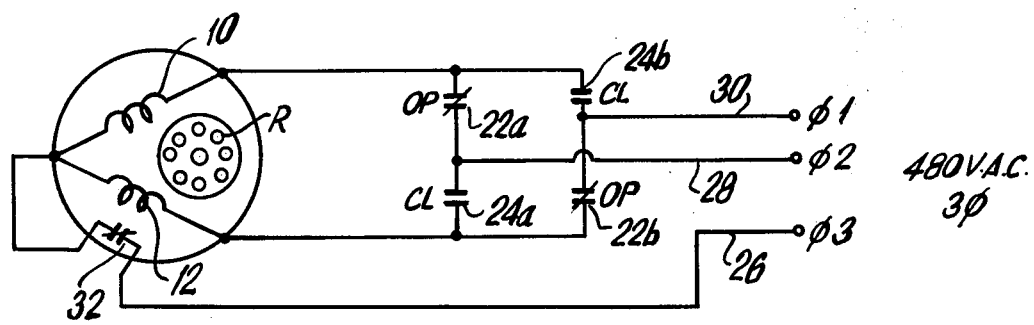
FIG. 3 is a schematic diagram of another embodiment of the invention.

The embodiment of the motor arrangement of the invention shown in FIG. 3 is connected for operation with a three-phase 480 V.A.C. power system. In this embodiment, the $\phi 1$ and $\phi 2$ lines are connected, respectively, to the ends of stator windings 10 and 12 in accordance with which of the pair of contacts 22 or 24 is closed. The normally closed contacts of a centrifugal switch 32 are connected between the $\phi 3$ line 26 and the junction 14 of the stator windings.

Upon starting of the motor in FIG. 3, the $\phi 3$ line is connected to the winding junction through the contacts of switch 32 so that a two-phase 480-volt signal is applied across the stator windings, thereby producing a high starting torque to the motor. Once the motor has reached its normal running or operating speed, the contacts of switch 32 are opened and the $\phi 3$ line 26 becomes disconnected from the stator windings. At this time, the motor continues to operate in the same manner as does a conventional single-phase motor having an operating voltage of 240 volts. Since each of the windings 10 and 12 is designed for operation at 240V, they can operate in series connection at the 480 V.A.C. starting voltage.

It will be appreciated from the foregoing description that the motor arrangement of the invention permits the operation of a modified induction motor with a three-phase power system. This arrangement permits the use of a reduced-cost motor for three-phase operation, and eliminates the need for the motor capacitor required in conventional single-phase motors. Moreover, particularly in the embodiment of FIG. 3, the motor of the invention operates with an increased starting torque.

It will also be appreciated that although the invention has been hereinabove described with respect to two embodiments, modifications may be made therein, all without departing from the spirit and scope of the invention. Thus, for example, the centrifugal switch 32 in FIG. 3 may be replaced by relay contacts associated wth a current sensing relay coil serially connected with either power phase φ1 or φ2. The relatively large motor starting current in the monitored power phase would close the contacts initially. The relay thereafter drops out responsive to the relatively lower valued motor run current.

What is claimed is:

1. An electric motor arrangement comprising a motor including a rotar and no more than first and second stator windings connected at a junction point, first means for operatively connecting on line of a three-phase power system to an end of one of said windings, second means for operatively connecting a second line of said three-phase power system to an end of the other of said windings, and third means for operatively connecting a third line of said power system to said junction of said windings, said first and second connecting means comprising a pair of alternately operable relay contacts.

2. The motor arrangement of claim 1, in which said third connecting means includes a centrifugal switch effective when the motor is running at below a predetermined speed to connect temporarily said third line to said junction.

3. The motor arrangement of claim 1, in which said third connecting means includes a centrifugal switch effective when the motor is running at below a predetermined speed to connect temporarily said third line to said junction.

4. A combination as in claim 1, wherein said third connecting means includes current sensing relay contacts, and further comprising a current sensing relay coil serially connected to one of said first or second power main lines.

5. A method of operating an induction motor including a rotor and mo more than first and second stator windings connected to one another at a junction with a three-phase power system, said method comprising the steps of operatively connecting one line of said three-phase system to one end of one of said windings, operatively connecting a second line of said power system to an end of the other of said windings, and operatively connecting a third line of said power system to said junction of said windings, said last-mentioned step including the step of temporarily connecting said third line to said junction through the closed contacts of a centrifugal switch.

* * * * *